No. 823,883. PATENTED JUNE 19, 1906.
F. T. LIGGETT.
ROTARY VALVE FOR ENGINES.
APPLICATION FILED AUG. 21, 1905.
5 SHEETS—SHEET 1.
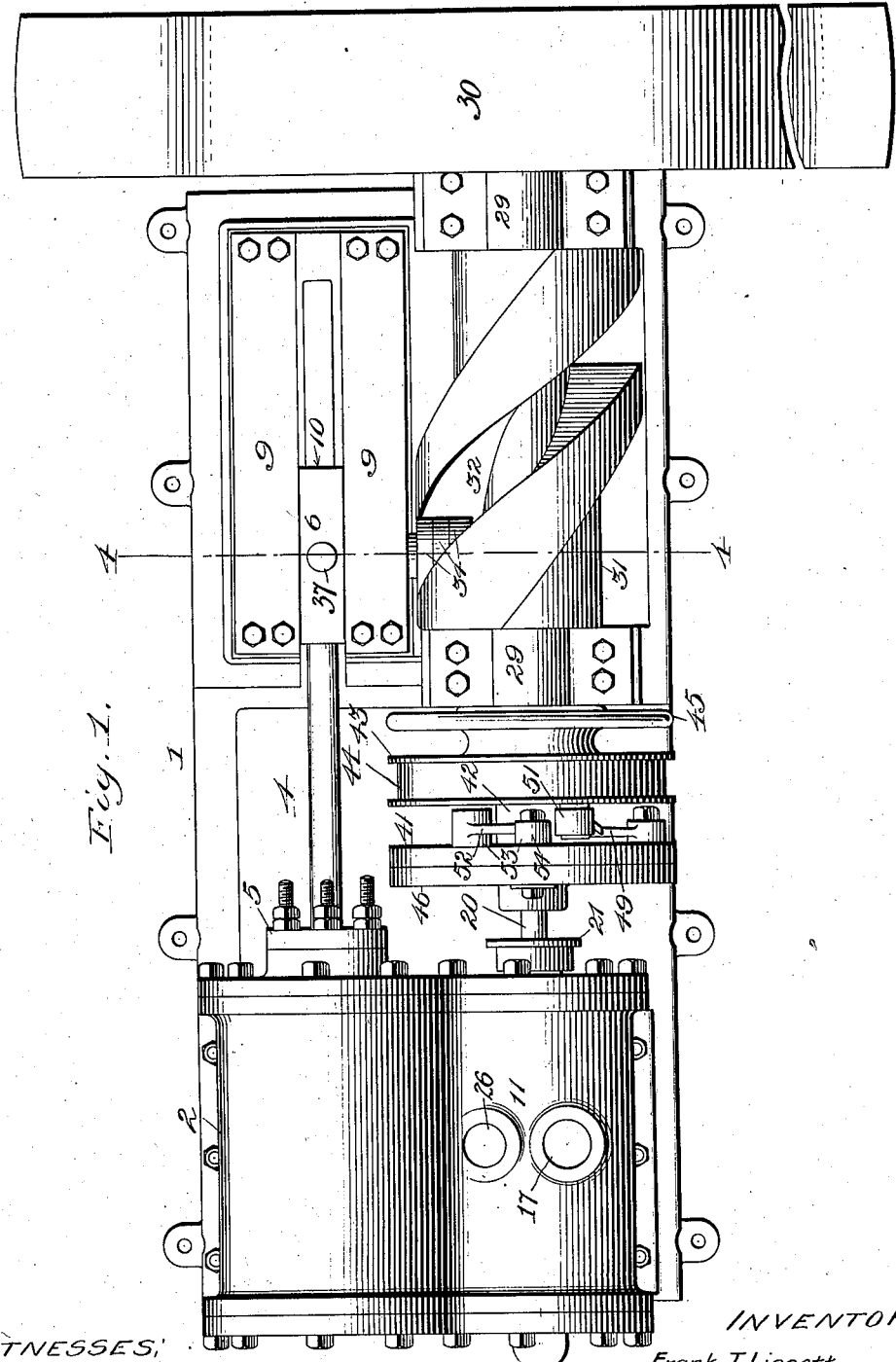
WITNESSES:
INVENTOR
Frank T. Liggett
by Dudley, Browne & Norton
ATTYS

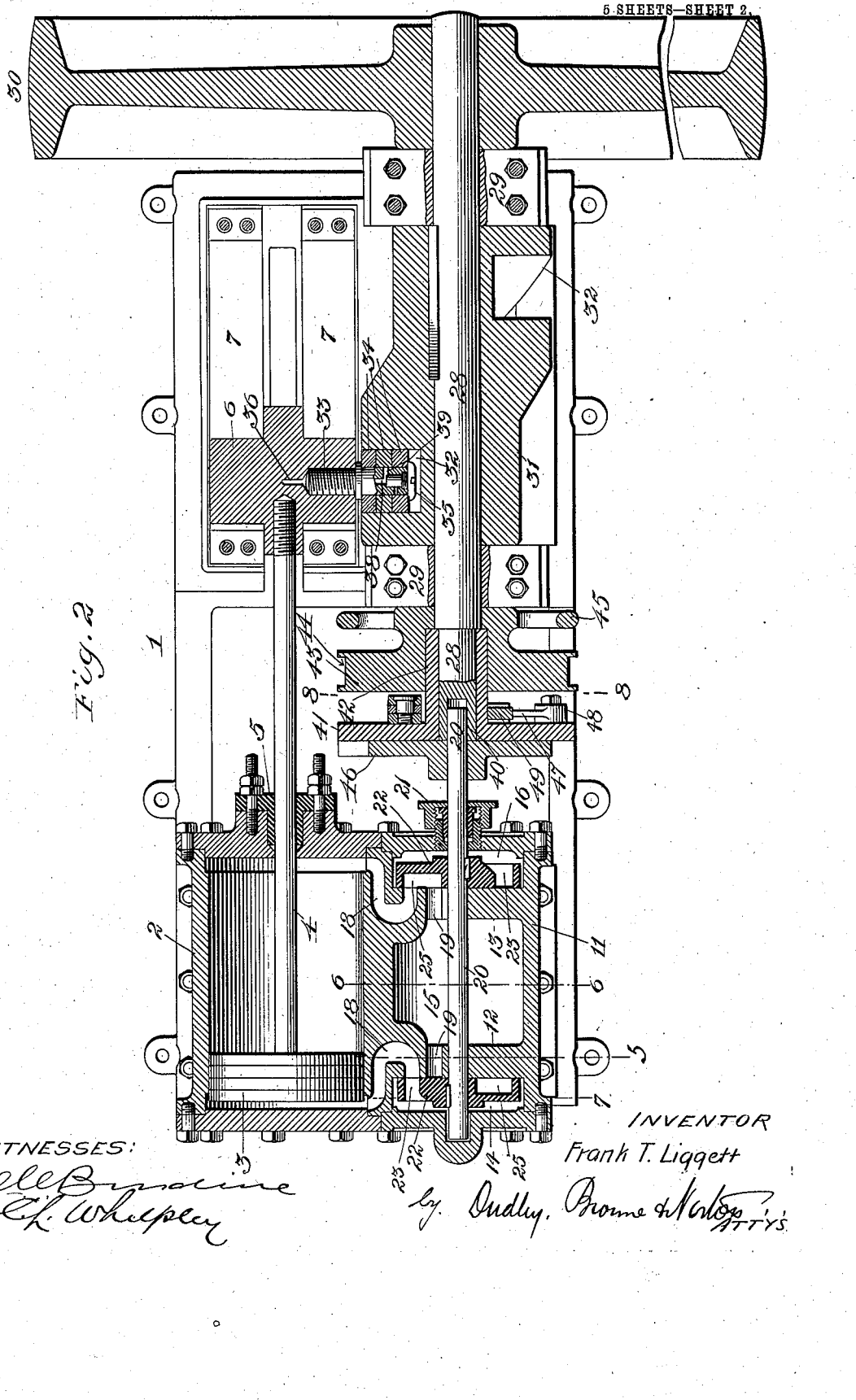

No. 823,883. PATENTED JUNE 19, 1906.
F. T. LIGGETT.
ROTARY VALVE FOR ENGINES.
APPLICATION FILED AUG. 21, 1905.
5 SHEETS—SHEET 3.
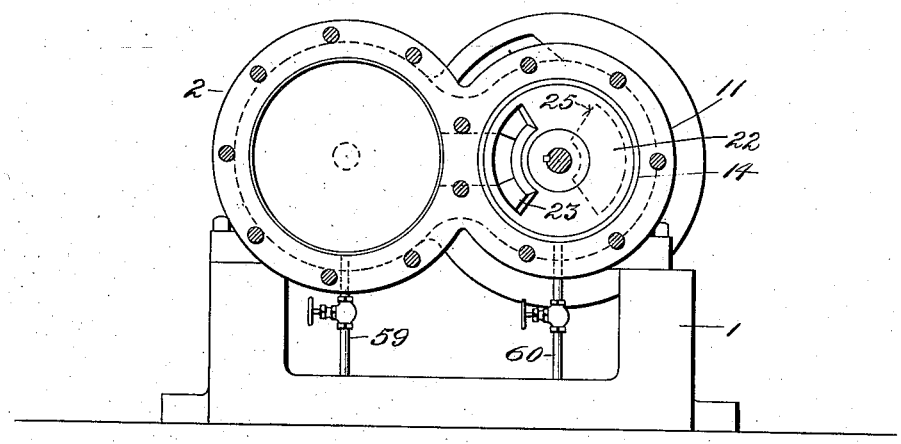
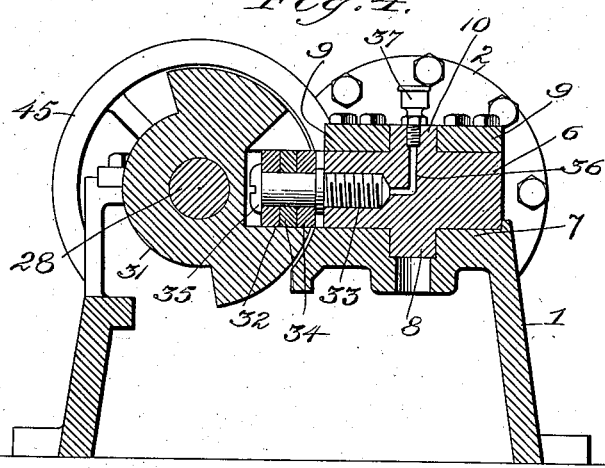
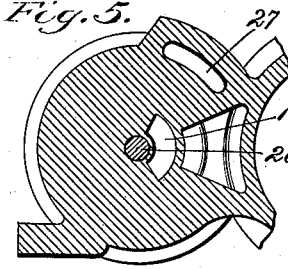
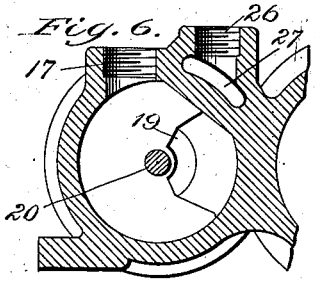
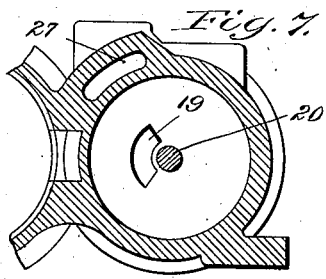
WITNESSES:
INVENTOR
Frank T. Liggett
by Dudley, Browne & Norton
ATT'YS No. 823,883. PATENTED JUNE 19, 1906.
F. T. LIGGETT.
ROTARY VALVE FOR ENGINES.
APPLICATION FILED AUG. 21, 1905.
5 SHEETS—SHEET 4.
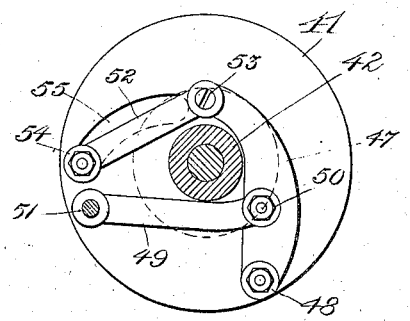
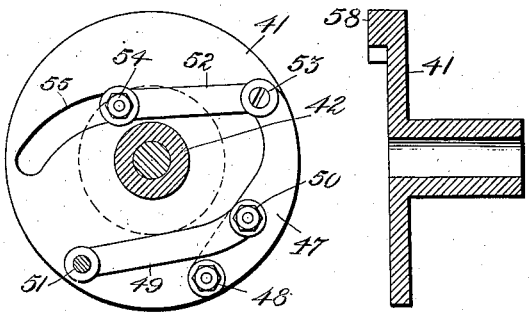
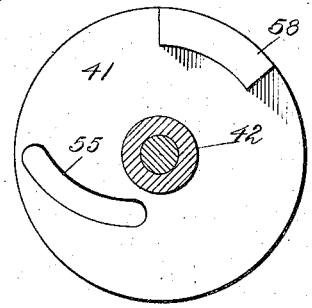
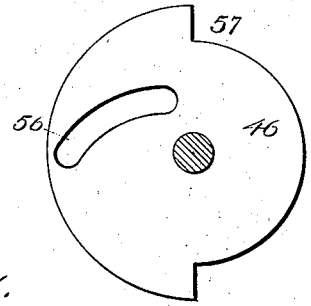
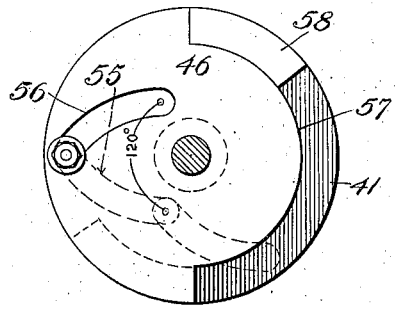
INVENTOR
Frank T. Liggett
WITNESSES:

No. 823,883. PATENTED JUNE 19, 1906.
F. T. LIGGETT.
ROTARY VALVE FOR ENGINES.
APPLICATION FILED AUG. 21, 1905.
5 SHEETS—SHEET 5.
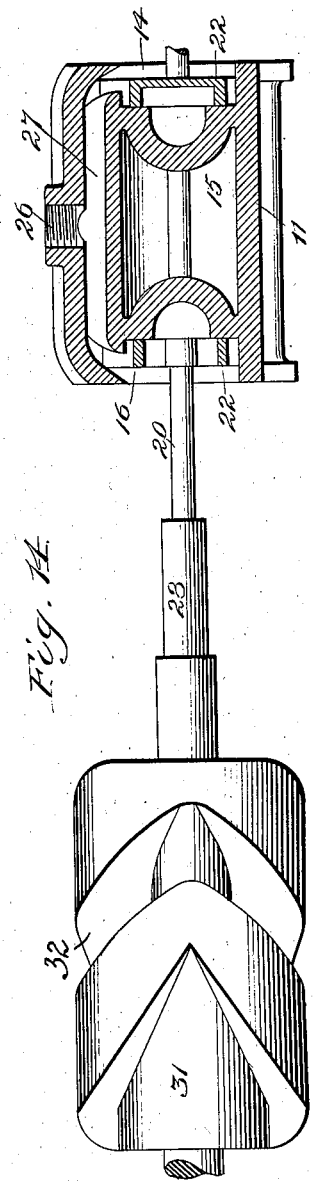
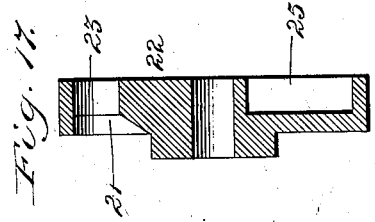
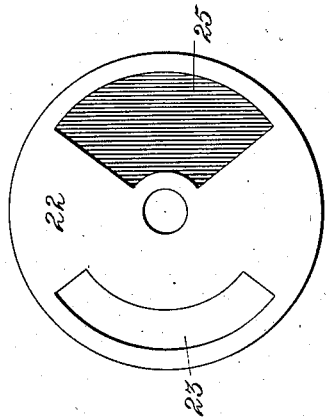
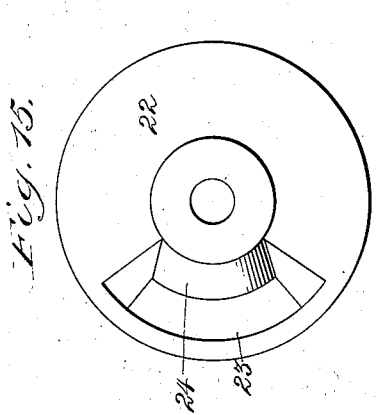
WITNESSES
INVENTOR
Frank T. Liggett
By Dudley, Browne & Norton
ATTYS

UNITED STATES PATENT OFFICE.

FRANK T. LIGGETT, OF NORTH YAKIMA, WASHINGTON, ASSIGNOR OF ONE-HALF TO JAMES A. DRAIN, OF OLYMPIA, WASHINGTON.

ROTARY VALVE FOR ENGINES.

No. 823,883.

Specification of Letters Patent.

Patented June 19, 1906.

Application filed August 21, 1905. Serial No. 275,101.

*To all whom it may concern:*

Be it known that I, FRANK T. LIGGETT, a citizen of the United States, residing at North Yakima, in the county of Yakima and State of Washington, have invented certain new and useful Improvements in Rotary Valves for Engines; and I do hereby declare the following to be a full, clear, and exact description of the invention, such as will enable others skilled in the art to which it appertains to make and use the same.

My invention relates to certain new and useful improvements in reciprocating engines; and the object of my invention is to improve the construction of such engines, so as to render them more efficient than heretofore and at the same time to make them more positive and direct in their action and more economical to construct and operate.
With these objects in view my invention consists in certain improvements in the valves by which the expansive fluid used for operating the engines is admitted to the cylinder and its admission to the cylinders controlled.
My invention also consists in improvement in the means for changing the position of the valves to reverse the direction of the engines.

My invention also consists in the use of rotary valves for controlling the supply of the expansive fluid and in rotating these valves direct from the power-driven shaft.

My invention also consists in certain parts and combinations, the preferred form of which will be first described in connection with the accompanying drawings and then the particular features of the invention pointed out in the claims.

The motive power for the engine which is the subject-matter of this application may be any expansive fluid, such as steam or other vapor, air or other gas. In the accompanying specification and claims I will use the term "steam" to denote the motive power; but I desire to have it understood that this is done merely for the sake of brevity and that any form of expansive fluid may be used instead of steam without departing from my invention and that my invention is adapted for use in connection with any form of expansive fluid.

Referring to the drawings, wherein the same part is designated by the same reference-numeral wherever it occurs, Figure 1 is a top plan view of the preferred form of my invention. Fig. 2 is a longitudinal central section of Fig. 1, taken in a plane parallel to the plane of Fig. 1. Fig. 3 is an end elevation with the cylinder and chest heads removed. Fig. 4 is a cross-section taken on line 4 4 of Fig. 1. Fig. 5 is a cross-section of the steam-chest, taken on line 5 of Fig. 2. Fig. 6 is a cross-section of the steam-chest, taken on line 6 6 of Fig. 2. Fig. 7 is a cross-section of the steam-chest, taken on line 7 of Fig. 2. Fig. 8 is a cross-section taken on line 8 8 of Fig. 2 and showing the connection by which the engine is reversed. Fig. 9 is a view similar to Fig. 8, showing the links which form the connections in the position they occupy when the engine is reversed. Figs. 10 to 17 are detail views of different parts of the invention.

1 designates a frame upon which the engine is supported, and this frame may be of any desired shape or form.

2 designates a cylinder, which is of the usual type, and 3 is a piston provided with the usual piston-rod 4, passing out through a stuffing-box 5.

6 is a cross-head secured to the end of the piston-rod, and this cross-head is in the form of a cross, as is best shown in Fig. 4. 7 7 are the lower guides for the cross-head. Between these guides project the portion 8 of the cross-head in order to steady the same. 9 represents the upper guides of the cross-head, which are also separated and between which extend the projection 10 on the upper side of the cross-head. By this construction it will be seen that the cross-head is guided in a right line in its reciprocation and all oscillation of the cross-head and piston-shaft prevented.

11 is a steam-chest, which in the form of my invention shown is cylindrical and located on one side of cylinder 2. The steam-chest in its interior is provided with the partitions 12 and 13, which divide the same into three compartments or chambers 14, 15, and 16. The chambers 14 and 16 are adapted to receive live steam, and from these chambers the steam passes into the ends of the cylinder. The chamber 15 is for the exhaust and is provided with an opening 17, (see Fig. 6,) through which the steam is exhausted.

18 designates ports which extend through the ends of the cylinder into the chambers 14 and 16, the ports entering the chambers 14 and 16 at one side, as best shown in Fig. 2.

19 19 are openings through the partitions 12 13 and connect the exhaust-chamber 15 with the chambers 14 and 16 adjacent to the point where the ports enter the chambers 14 and 16, the openings 19 forming the exhaust-ports.

20 is a shaft which extends through the center of the steam-chest and is mounted in suitable bearings in the partitions 12 and 13 and in the head of the steam-chest and at the front end passes through a suitable stuffing-box 21.

22 22 are disks which are mounted on the shaft 20, one disk being located in each of the chambers 14 and 16. These disks are shown in detail in Figs. 14, 15, and 16, and, referring to these figures, it will be seen that they are provided with a segmental opening 23, extending clear through the disks, this opening being outwardly inclined, as at 24, on the side into which the steam passes in order to give free admission to the steam. In the side of the disk 22 opposite that having the opening 23 is a substantially sector-shaped depression 25, which is for the purpose of connecting the port from the cylinder with the exhaust-port, as will be hereinafter described. The valves 22 are keyed on the shaft 20, so that their faces are in contact with the partitions 12 and 13, with the sector-shaped depressions 25 against the partitions. These disks, which form rotating valves, do not fill the chambers 14 and 16; but between the disks and the cylinder-heads there is a space into which the live steam is admitted from the inlet-port 26 through the way 27, which opens into the chambers 14 and 16.

From the construction just described it will be seen that as the shaft 20 is rotated the valves will be rotated, and as they are oppositely disposed upon the shafts 20 they will alternately admit live steam into the ends of the cylinder by the openings 23 coming over the ends of the port 18 and will alternately connect the ports 18 with the exhaust-port 19 by the sector-shaped depressions 25 coming over the ports 18 and 19 and connecting the same, as clearly shown in Fig. 2.

28 is the driven shaft of the engine, and this shaft is mounted in line with the valve-shaft 20, and consequently is parallel with the piston-rod 4. This shaft is mounted in suitable bearings 29, supported on the frame 1.

30 is an ordinary band-wheel on the end of the shaft 28, from which power may be taken off.

31 is a sleeve which is keyed to the shaft 28 between the bearings 29. This sleeve is provided on its periphery with a right and left helical cam-groove 32 of the form shown in Figs. 1 and 14. The portion of the sleeve beyond the cam-groove is cut away in order to reduce and equalize the weight on the shaft.

33 is a pin which is tapped in the side of the cross-head 6 and extends from the cross-head 6 into the cam-groove 32. In order to reduce friction between the sides of the cam-slot and the pin, the pin is provided with one or more disks 34, which are held in position by a screw 35, tapped into the end of the pin. In order to oil the rollers 33 and also the cam-groove 32, I provide a duct 36, which extends from the top of the cross-head, where it is provided with an oil-cup 37 into the end of the opening into which the pin 33 is tapped. The pin 33 is provided with a duct 38, which extends through the pin and at its outer end is closed by the screw 35. The duct 38 is provided with transverse ducts 39, which extend to the periphery of the pin inside of the rollers 34, whereby each of the rollers is supplied with the oil, and surplus oil can pass between the rollers onto the cam.

By the construction just described it will be seen that at each complete reciprocation of the piston the shaft 28 will, by reason of the helical cam 32, be given a complete rotation.

In order to drive the valve-shaft 20 and operate the valves, I connect said shaft with the shaft 28 in order that it may be rotated in unison therewith, and since it is desirable to be able to reverse the engine I so construct this connection between the two shafts that the shaft 20 may be rotated in respect to the shaft 28 to change the position of the valves with relation to the position of the piston. The end of the shaft 20 projects into the bored-out end 40 of the shaft 28 in order to keep the two shafts in line.

41 is a disk provided with a collar 42, which is fast on the shaft 28. Preferably, and as shown, the end of the shaft 28 is slightly reduced, and the collar 42 fits over this reduced portion.

43 is a disk which is preferably provided on its periphery with a groove 44, with which a band or other form of brake is adapted to coöperate for a purpose to be hereinafter described. Preferably formed integral with the disk 43 by being carried on a collar extended from one side thereof, is a hand-wheel 45, by which the disk 43 may be rotated, the disk being loosely mounted partly upon the collar 42 and partly upon the shaft 28 between the collar 42 and the bearing 29.

46 is a third disk which is fast on the shaft 20 with its face adjacent to the face of the disk 41.

Pivotally mounted at 48 on the disk 41 on the side adjacent to the disk 43 is a link 47. 49 is a second link, one end of which is pivoted at 50 to the link 47 intermediate of its ends, the other end of the link 49 being connected to the disk 43 by the pivot 51.

52 is a link, one end of which is connected by a pivot 53 to the free end of the link 47, the other end being connected to a roller-equipped pin 54, which extends through a curved cam-slot 55, cut in the disk 41, and also through a similar-shaped slot 56, cut in the disk 46. These slots 55 and 56 in the adjacent disks 41 and 46 are in crossed relation to each other, and when the pin 54 is moved from the position shown in Fig. 8 to the position shown in Fig. 9 it will give the disk 46 a rotation of one hundred and twenty degrees with respect to the disk 41. (See Fig. 13.) This movement of the pin 54 is caused by either turning the hand-wheel 45, if the engine is stationary, or, if the engine is running, by applying a brake to the disk 43, which in either case will move the links from the position shown in Fig. 8 to the position shown in Fig. 9, causing the cam-pin 54 to move the disks. Preferably and as shown the disk 46 is cut away on its periphery at 57 for one-half of its circumference, and the disk 41 is provided with a segmental portion 58, which extends into the cut-away portion 57. When the disks are in position for the engine to run either ahead or backward, the end of the projection 58 will rest against one end of the cut-away portion 57, and thus take all strain off the connecting links and pins, causing the two disks to rotate together and the shaft 20 to rotate with the shaft 28.

59 and 60 are the ordinary drain-pipes, by which the steam-chest and cylinder are drained. Preferably there are three drain-pipes at the steam-chest, one for each chamber and two for the cylinder, one at each end.

From the above description of the preferred form of my engine it is believed that its operation is apparent. This operation briefly is as follows: The parts being in the position shown in Fig. 1 and steam being admitted from the intake 26, it passes through the opening 27 into each of the chambers 14 and 16 of the steam-chest. It will be seen that the steam-pressure is behind the valves 22, and consequently holds them upon their seats. With the parts in position as shown in Fig. 2 the steam passes through the chamber 14 into the cylinder and behind the piston, driving the piston forward, which through the connection between the crosshead 6 and the cam 32 rotates the shaft 28. This shaft through its connections turns the shaft 20 and rotates the valve 22, so that after the piston has traveled a part of its stroke the port leading from the chamber 14 of the steam-chest is closed, and the portion 25 of the valve comes over the ports 18 and 19, connecting the end of the cylinder with the exhaust. At the same time the valve in the chamber 16 is rotated and connects the ports 18 with the chamber by bringing the opening 23 in the valve over the port 18. Steam is then admitted in the other end of the cylinder, and the movement of the piston is reversed. When it is desired to reverse the engine, either the hand-wheel 45 is operated or a brake is applied to the disk 43, depending upon whether the engine is stationary or running. In either case the disk 43 is rotated upon the collar 42, which through the links 47, 49, and 52 moves the pin 54 in the cam-slots 55 and 56 of the disks 41 and 46, thereby rotating the disk 46, fast on the shaft 20, in relation to the disk 41, fast on the shaft 28. This causes the valves to reverse their position, and consequently reverses the direction of the engine.

While I have described what I believe to be the preferred form of my invention, I desire to have it understood that many changes may be made in the form, arrangement, and construction of parts without departing from the spirit of my invention.

What I claim as new, and desire to secure by Letters Patent, is—

1. In an engine provided with a cylinder, a reciprocating piston, a driven shaft parallel to the piston-rod and power-transmitting means between said rod and shaft; a steam-chest having ports opening into the cylinder, valves to open and close said ports, a shaft connected with said valves and arranged in alinement with the said driven shaft, a disk on the driven shaft, a disk on the valve-shaft, said disks each having cam-slots, a pin passing through said slots, links connecting the pin with one of the disks, and means for moving said links to vary the position of the pin.

2. In an engine, the combination with a cylinder, provided with a reciprocating piston, a steam-chest provided with ports opening into the cylinder, valves to open and close the ports, a valve-shaft by which the valves are operated, a second shaft driven by the engine, said shafts being in line with each other, a disk on the driven shaft, and a disk on the valve-shaft, cam-slots in each of said disks, a pin passing through said cam-slots and means for moving said pin in said slots to cause the disks to move in relation to each other and reverse the engine.

3. In an engine, the combination with a cylinder, provided with a reciprocating piston, a steam-chest provided with ports opening into the cylinder, valves to open and close the ports, a valve-shaft by which the valves are operated, a second shaft driven by the engine, said shafts being in line with each other, a disk on the driven shaft, and a disk on the valve-shaft, cam-slots in each of said disks, a pin passing through said cam-slots and links carried by one of said disks and connected to the pin and means for operating said links to move the pin in the slots to cause the disks to rotate in relation to each other and reverse the engine.

4. In an engine, the combination with a cylinder, provided with a reciprocating piston, a steam-chest provided with ports opening into the cylinder, valves to open and close the ports, a valve-shaft by which the valves are operated, a second shaft driven by the engine, said shafts being in line with each other, a disk on the driven shaft, a disk on the valve-shaft, cam-slots in each of said disks, a pin passing through said cam-slots, a third disk provided with means whereby it can be rotated with respect to the first disk, link connections between said first disk and said pin, whereby when said third disk is moved in relation to the first disk the pin in the cam-slots causes the first and second disks to move in relation to each other and reverse the engine.

In testimony whereof I affix my signature in presence of two witnesses.

FRANK T. LIGGETT.

Witnesses:
FRANK HORSLEY,
H. H. LOMBARD.